(12) United States Patent
Zweig

(10) Patent No.: US 7,096,090 B1
(45) Date of Patent: *Aug. 22, 2006

(54) MOBILE ROBOTIC ROUTER WITH WEB SERVER AND DIGITAL RADIO LINKS

(76) Inventor: Stephen Eliot Zweig, 224 Vista de Sierra, Los Gatos, CA (US) 95030

( * ) Notice: Subject to any disclaimer, the term of this patent is extended or adjusted under 35 U.S.C. 154(b) by 339 days.

This patent is subject to a terminal disclaimer.

(21) Appl. No.: 10/700,240

(22) Filed: Nov. 3, 2003

(51) Int. Cl.
*G06F 19/00* (2006.01)

(52) U.S. Cl. .................. 700/245; 700/94; 700/246; 700/249; 700/250; 700/256; 700/259; 700/264; 701/117; 701/118; 701/208; 701/213; 701/215; 709/101.01; 714/18

(58) Field of Classification Search .............. 700/245, 700/94, 246, 249, 250, 256, 259, 264; 701/208, 701/213, 215, 117, 118; 709/218, 223; 379/101.01; 714/18
See application file for complete search history.

(56) References Cited

U.S. PATENT DOCUMENTS

| | | |
|---|---|---|
| 4,964,062 A | 10/1990 | Ubhayakar et al. |
| 5,046,022 A | 9/1991 | Conway et al. |
| 5,231,693 A | 7/1993 | Backes et al. |
| 5,331,413 A | 7/1994 | Diner |
| 5,742,845 A | 4/1998 | Wagner |
| 5,905,908 A | 5/1999 | Wagner |
| 5,961,594 A | 10/1999 | Bouvier et al. |
| 5,995,745 A | 11/1999 | Yodaiken |
| 6,041,362 A | 3/2000 | Mears et al. |
| 6,144,844 A | 11/2000 | Rainish |
| 6,368,177 B1 * | 4/2002 | Gabai et al. ................. 446/404 |
| 6,456,938 B1 * | 9/2002 | Barnard ....................... 701/213 |
| 6,773,344 B1 * | 8/2004 | Gabai et al. ................... 463/1 |
| 6,917,893 B1 * | 7/2005 | Dietsch et al. .............. 702/150 |
| 6,922,632 B1 * | 7/2005 | Foxlin ........................ 701/207 |
| 2003/0176986 A1 * | 9/2003 | Dietsch et al. .............. 702/150 |

OTHER PUBLICATIONS

Lobo et al., Integration of intertial information with vision towards robot autonomy, 1997, IEEE, p. 825-830.*
Craig Sayers "Remote control robotics" Springer-Verlag, New York (1988), Chapter 4.
Hirashi et. al., "Web-based Communication and Control for Multiagent Robots", 1998, IEEE/RSJ Conf.

* cited by examiner

*Primary Examiner*—Thomas G. Black
*Assistant Examiner*—McDieunel Marc

(57) ABSTRACT

The invention is a computerized mobile robotic router with an onboard internet web server, and a capability of establishing a first connection to a remote web browser on the internet for robotic control purposes, and a capability of establishing a second short range bi-directional digital radio connection to one or more nearby computerized digital radio equipped computers or devices external to the robot. The short-range bi-directional digital radio connection will typically have a maximum range of about 300 feet. In a preferred embodiment, this short-range wireless digital connection will use the 2.4 gHz band and digital protocols following the IEEE 802.11, 802.15, or other digital communications protocol. By employing the proper set of external short-range digital radio devices capable of interfacing with the robot (such as sensors, mechanical actuators, appliances, and the like), a remote user on the internet may direct the robot to move within range of the external devices or computers, and connect these devices or computers to the internet.

8 Claims, 3 Drawing Sheets

MOBILE ROBOTIC ROUTER WITH WEB SERVER AND DIGITAL RADIO LINKS

This application claims the priority benefit of co pendent patent application Ser. No. 10/047,574 "Mobile robotic with web server and digital radio links", filed Jan. 14, 2002. Application Ser. No. 10/047,574 claimed benefit of provisional patent application Ser. No. 60/261,741 "Mobile robotic system with onboard Internet web server, and short-range bi-directional digital radio links to external computerized devices", filed Jan. 16, 2001.

BACKGROUND OF THE INVENTION

1. Field of the Invention

The invention relates to means by which mobile robots, equipped with computer operated onboard internet web serves, short range digital radio transceivers, and routers may be locally or remotely teleoperated over the internet, and directed to connect other external computers and computer controlled devices, also equipped with short range digital radio transceivers, to the internet.

2. Description of the Related Art

Although self-propelled mobile robots have been the subject of speculative literature and experimentation for a number of years, the field is still in its infancy. With the partial exception of industrial automation for highly repetitive situations, educational purposes, and toys, mobile robots are not widely used. This is because the problems of coping with machine vision, artificial intelligence, general purpose robotic "arm" and "hand" like actuation systems, limited battery life, and the like make it difficult to devise flexible and general purpose systems suitable for widespread use.

Because robotic artificial intelligence is particularly difficult to achieve, human operators often remotely control robots. A number of techniques for robotic remote control (teleoperation) are known in the art, and these are discussed in the book: "Remote Control Robotics" by Craig Sayers, published by Springer-Verlag, New York, (1998) and incorporated herein by reference.

Other prior are includes U.S. Pat. No. 4,964,062 which teaches a type of robotic arm that may be controlled by radio from a remote location, and may be programmed by radio from a remote location. U.S. Pat. No. 5,331,413 describes an external camera used to view a robot. U.S. Pat. Nos. 5,231,693 and 5,046,022 describe methods of semi-automating telerobotic control. U.S. Pat. No. 6,144,844 describes methods to compensate for variable teleoperation delay.

Recently, programming techniques used to increase the power and flexibility of the Internet have matured, and a number of these newer programming techniques can also be adapted to robotic control methods. In particular, this includes programming languages, interfaces, and protocols used to generate (serve) and interpret (browse) World Wide Web pages on the Internet.

World wide web (also called "Web" or "Net") servers are computer programs, such as "Apache", and the like, that communicate over the internet in the form of variants of Standard Generalized Markup Language (SGML), such as Hypertext Markup Language (HTML), Extensible Markup Language (XML), Extensible HTML (XHTML), and the like. These servers accept commands from a remote user, and respond by returning SGML variant "web pages" or forms that can be read and interpreted by the remote user's browser.

Data is transferred over the Internet through a series of "routers", where each router acts to receive a data packet from one part of the network that the router is connected to. The router examines the destination address of the data packet, consults the router's memory to determine the router's current understanding of the network configuration, and then sends the data packet along to another router that will normally bring the data closer to the final destination address. Alternatively, if the router is directly connected to the final destination, the router will send the data packet directly to the final destination.

For purposes of this discussion, "web page" is defined as an HTML, XML, or XTML electronic document on the World Wide Web, identified by a unique Universal Resource Identifier (URI) or unique Universal Resource Locator (URL), and transmitted over the Internet using the (HTTP) Hypertext Transfer Protocol, and usually the TCP/IP protocol. Also for purposes of this discussion, "web server" is defined as computer program functionality (either stand alone, or part of an operating system) that, in response to an internet URL or URI request, sends back a "web page" file to the internet address that made the request, or alternatively passes the URL or URI request through a "Common Gateway Interface" or CGI protocol to a CGI compliant program, and when the CGI compliant program has output, and passes the output back to the internet address that made the original URL or URI request.

Use of the CGI interface greatly enhances the flexibility and power of web/server—SGML variant web form technology. Here, the HTML or SMGL variant web form can be instructed to pass data of any sort to and from the user to programs, executable scripts, or software processes that are distinct (external) from the main web server program. This non-web server software may be a database, image manipulation program, robot control program, or any other independently running process. Data submitted from a web browser to a web server's CGI interface is generally submitted either appended to a CGI URL address (GET method, limited to 255 maximum characters of data) or through a STDIN standard input method (POST method, no data size limitation). Data from a web server to a web browser may be of any sort, as long as it complies with the Multipurpose Internet Mail Extensions (MIME) format.

Prior art on the GCI interface includes U.S. Pat. Nos. 6,041,362; 5,961,594; 5,905,908; and 5,742,845. A more complete CGI discussion is given in Dwight, Erwin and Niles book: "Using CGI, Second Edition", 1997, published by Que corporation, and incorporated herein by reference.

In addition to SGML variant files (HTML, XML, XHTML, etc.), programming languages such as Java are also frequently transmitted by servers on the word wide web. Java (and Java-like languages such as C#), is a general purpose, object oriented, high level programming language, commonly used on the world wide web to deliver enhanced functionality to web pages. Typically Java commands are embedded in SGML variant files that frequently sent out (and occasionally also received) by web servers. Such Java "applets" can then perform many specialized functions. In particular, Java applets may be used to extend the basic SGML functionality, and can translate user commands to other languages, display video, display interactive graphics, and other useful functions.

Web browsers are likewise commonly known in the art. For the purposes of this patent, a "web browser" is considered to be a program that can read and interpret the SGML variant files sent out by web servers, (primarily HTML files) and optionally execute Java and/or additional plug-in module commands. Examples of modern web browsers include Microsoft Internet Explorer 5.0 or greater, Netscape Navigator 5.0 or greater, and the like.

For robotics control purposes, in order to take advantage of the wide variety of "off-the-shelf" software, originally written for internet or other purposes, for robotics control, it is preferable to use software (programs) that run on standard operating systems, rather than software that attempts to run directly on the underlying robotic computer hardware. Standard operating systems, such as Windows, Linux, Unix, and the like, manage much of the software burden of a computational system by controlling access to underlying hardware, memory management, and the like, relieving the programmer of much complexity. Popular (e.g. widely used) multi-tasking operating systems are particularly advantageous, since thousands of programs are available that have previously been written for them. By use of a popular operating system, a robotics programmer may leverage his or her limited time and energy by using standard programs to handle most of the robotics system, and only writing robot specific software when absolutely necessary. The one drawback of this approach from a robotics control standpoint is some potential loss or degradation of precise real-time determinism and control, which can be overcome by the use of real-time modifications or patches to such operating systems. An example of a popular operating system (Linux), modified to enhance real-time determinism and control, is taught by U.S. Pat. No. 5,995,745 for "real time Linux". Other such real-time operating system enhancements also exist.

Previous art teaches that both mobile and non-mobile robots may have their movement and video functions controlled remotely by using web browser/web server technology. For example, the Intelligent Autonomous Systems Engineering Laboratory of the University of the West of England, Briston teaches that web server technology may be used in mobile robotic systems. They have developed in "LinuxBot". This is a mobile robot, intended as an educational project, that performs a number of functions, including movement and wall avoidance, as well as serving web pages, using an on-board multitasking embedded Linux operating system environment with a wireless link to a local area network. The robot has no "arms" or other actuators, nor other means to control other external computer controlled devices. Its primary purpose is as an academic training device.

iRobot Corporation of Somerville, Mass. produces the "iRobot-LE", a mobile robot containing an onboard computer running an "apache" web server under the Linux operating system. Users may remotely control this system over the Internet using standard web browsers. Because the device contains neither robotic "arms" other actuators, or means to control other external computer controlled devices, it has limited practical utility.

A number of examples of non-mobile robotic systems, such as robotic arms controlled by remote web browsers over the Internet, also exist. Some of these are documented in Chapter 4 of the previously discuss "Remote Control Robotics" reference. Typically these are demonstration systems that can move a few test items, or perform some other limited chore. Other examples include different types of robotic telescopes. In one implementation, a remote viewer using a standard Internet browser positions a robot telescope. The telescope is commanded by a version of XML called AMIL (Astronomical Instrument Markup Language), which is interpreted by a Java program running locally on the robotic telescope.

Although such prior art is useful for situations in which self-mobile robots are used to directly interact with their local environment, or in which peripheral devices attached to non-mobile robots are remotely controlled over the internet, there exist situations in which it is desirable to extend the functionality of a web browser/server controlled mobile robotic system beyond those peripherals that are directly connected to the robot. In particular, there are situations where it is desirable to bring a capable mobile robot close to a particular location, use the sensors onboard the robot to observe local conditions, and then manipulate one or more additional devices in the location that would otherwise be impractical to control by direct manipulation by the robots onboard arms, manipulations, etc.

For example, there may be situations where it is desirable to employ a mobile robot for indoor or outdoor security guard functions. Here, the robot may be given a general route to travel by a remote Internet operator, as well as standing orders to observe its surroundings by its onboard camera, and as check and adjust the status of various external robotic cooperative monitors. The remote internet operator may also wish to leave standing orders for the robot to travel different routes, open robotic cooperative doors, sound robotic cooperative alarms, etc., depending upon the data that is received from the external monitors.

As a second example, there may be situations where it is desirable to employ a mobile robot to monitor and adjust robotic cooperative equipment in an industrial or laboratory facility. Here, the robot would be given general routes to travel by one or more workers over the Internet. The robot would travel the specified routes, check the status of external equipment monitors, and additionally modify the state of the external equipment, using various standing orders that the remote operators may have left. Such a system would be particularly useful in a flexible manufacturing industrial setting, or laboratory, where many operators, residing in many remote locations, have a desire to use the equipment on a time-share basis.

In a third example, the mobile robot of this invention might be used in a home situation to travel throughout the home and observe pets, children, or elderly people, and perform service functions such as fetching food from specially modified robotic cooperative refrigerators, cook food in robotic cooperative ovens, or process utensils or dishes in specially modified, robotic cooperative, dishwashers, garbage compactors, etc. Other home functions where such a robot could interact with specially modified, robotic cooperative, appliances include sprinklers to water plants, equipment to care for pets, cleaning equipment, heating and air conditioning equipment, security equipment, and the like.

In a fourth example, the mobile robot of this invention might be used as a mobile Internet router. Here the robot may be directed to move in such a way as to connect an isolated part of the internet, such as a single computer, single device, local network of computers, or local network of devices with the main body of the internet. Here the commands to move the robot may issue from either the robot's internal programming, the robot's response to environmental stimuli, from the local computer or device, or from a computer or device connected to the main body of the internet.

For the purposes of this discussion, a "mobile" robot is considered to be a robot that moves on solid surfaces, water, or air due to the controlled action of onboard motors or mechanical actuators, such as motorized wheels, tracks, legs, propellers, jets, and the like.

A robot that moves only by the application of outside force, even if portable and easily carried, is not considered to be "mobile".

Because it is difficult to design a mobile robot with sufficient visual acuity or dexterity to work with a wide variety of human operated equipment, the problem may be considerably simplified if the requirement that the robot directly observe external sensors or directly manipulate external equipment is reduced or dropped. This may be done by modifying the external sensors or equipment to be "robotic cooperative" by having an ability to report their status, and be operated by, short range, bi-directional, digital radio links (abbreviated here as "SBDRL" for Short-range Bi-directional Digital Radio Link). If this is done, then the robot need only get close enough to the sensor or equipment to make radio contact with the external device. Once this is done, the robot may then ascertain the other device's status by short-range digital radio link, and optionally make additional observations or manipulations using the robot's own on-board equipment. The robot can then transmit its findings and receive commands from operators from any location throughout the world using inexpensive and commonly used Internet (web) browser systems to relay to the external device.

To achieve these objectives, it is desirable to give a web browser/server controlled mobile robot an additional capability to manipulate its local environment by sending and receiving bi-directional short-range digital radio signals that can be used to control local devices that are external to the robot. In this context, "local" and "short-range" are defined to be distances between about 0 and 300 feet.

Means to control various computerized devices by local digital radio links are known in the art. Although many different radio frequencies and digital encoding schemes can be used for these purposes, use of the 2.4 gigahertz (gHz) industrial-scientific-medical frequency band, which is internationally reserved for local digital links, and does not require a license, is particularly advantageous. It is also advantageous to use standard digital-encoding schemes, as this increases the variety of devices that the robot can communicate with.

There are a number of standard protocols for communicating digital information in the 2.4 gHz frequency, such as the Institute of Electrical and Electronics Engineers (IEEE) standards 802.11, and the IEEE 802.15 and 802.15b standard for personal area networks (PAN). The disclosures for these standards are incorporated herein by reference.

IEEE standard 802.11 discloses a set of local digital radio link protocols compatible with the HomeRF specification. The HomeRF standard, in conjunction with the Shared Wireless Access Protocol (SWAP), enables local low power digital 2.4 gigahertz radio communication with a range of up to 150 feet between devices. Up to 10 different devices may be networked within this radius.

IEEE standard 802.15 discloses a set of local digital radio link protocols compatible with the Bluetooth™ specification. (Bluetooth is a trademark of the Bluetooth special interest group). Bluetooth compliant low power digital radio systems can automatically establish very short range (0–30 feet) or longer short range (0–30 feet) wireless digital radio linkages with other Bluetooth compliant devices. Further discussion of the Bluetooth standard may be found in the book: "Bluetooth revealed" by Miller and Bisdikian, Prentice Hall PTR publisher (2000), and incorporated herein by reference.

Previous examples of remotely controlled robotic systems that use short-range digital radio links to control local peripherals include the 1996–1997 NASA Mars "Pathfinder" and "Sojourner" robotic system. In this system, a stationary robot (the Pathfinder) was controlled by unique NASA protocol using a long-range radio link to earth. The stationary Pathfinder robotic system then established a short-range digital link at 459 MHz with the mobile Sojourner rover, and controlled its movement and sensors. The results were communicated back to earth using unique NASA transmission schemes. Because these techniques used non-standard, non-SGML variant, non-HTTP protocols, complex, customized and expensive equipment and programs were required in order to correctly control the Sojourner robotic rover. The techniques and software used were not general purpose, and thus could not be used for purposes beyond controlling the specific system at hand.

There appears to no prior art teaching the use of mobile, Internet capable, web browser/server controlled robots to travel to nearby devices, and subsequently monitor and/or control the devices by use of bi-directional short-range digital radio links. Nonetheless, such devices would enable remote users to control sophisticated robotic systems using inexpensive and readily available equipment and software, and thus would be of significant practical utility.

SUMMARY OF THE INVENTION

At present, mobile robots and robotic systems tend to be inflexible, specialized, and expensive. In order to bring the advantages of robotic automation into more general use, robots must be designed that are simple, low-cost, and general purpose. Such robotic systems can be can be constructed according to the principles disclosed herein. This is done by combining the flexibility and generality of Internet technology, with mobile, capable, and general-purpose robots, and multiple SBDRL external peripherals that are optimized to address specific tasks.

In the broadest sense of the invention, the "robot" disclosed here is a self-propelled mobile internet router with a built in internet server, and a capability of establishing both a first connection to the internet for robotic control purposes, and a capability of establishing a second bi-directional digital radio connection to one or more local digital radio devices that are not themselves directly connected to the internet, and which have a maximum radio range of about 300 feet. The router, once it is within range of the external digital radio devices, can then exchange data packets between the external devices and the Internet.

In a preferred embodiment, this short-range wireless digital connection will use the 2.4 GHz band and digital protocols following the IEEE 802.11, 802.15, or other digital communications protocol. By employing the proper set of external short-range digital radio devices capable of interfacing with the robot, a system of considerable practical utility can be devised.

It is contemplated that the self-propelled mobile Internet server robot will generally serve SGML variant web pages that are designed to be read by humans, and work with standard Internet web browsers under direct human control. However for greatest generality and usefulness, direct human control is not strictly required. Human readable SGML variant (typically HTML) web pages can also be scanned, parsed, and interpreted by automated techniques. Depending upon the situation at hand, it may be advantageous to parse the web pages automatically at a remote site, and remotely control the robot by remote computational resources, (standard computer microprocessors, supercomputers, computer clusters, and the like) that are more sophisticated than the robot's own onboard computer.

The robotic disclosed here may be controlled by three different general methods. These control methods are local robotic control, remote automated control, and remote human control. Local robotic control would typically handle routine, simple, or fast response time tasks that are best done by executing previously stored instructions using the robot's onboard computing facilities. Remote automated control would typically consist of standardized but more computationally challenging tasks, such as sophisticated computer vision, sophisticated robotic control algorithms, etc., best handled by larger and more sophisticated remote computational resources specialized for these purposes. Rarely occurring (non-routine) tasks, complex tasks, or other tasks requiring human judgement would then be handled by humans using remote internet browsers that read standard HTML or SGML variant web pages served by the robot's onboard web server.

Allowing either remote human and remote computer judgement to be used depending upon the situation increases the scope and flexibility of the robotic system. This is desirable because it enables large numbers of such systems to mass produced for a variety of different uses, leading to a lower per-unit cost for each system.

It is anticipated that the robot would receive its most general (highest level) commands from the remote Internet link. However there may often be situations where it is advantageous to enable the robot to interpret and modify these top-level commands in a quick, real-time manner, depending upon the state of the robot's sensors and local conditions. In other situations, the robot may be used to perform repetitious tasks that fit within the capability of the robot's onboard computer processor.

For example, a robot may be given a remote command over the Internet to move forward a number of feet. However if a contact sensor on the robot shows that the robot has encountered an unseen obstruction, the top-level internet command may be modified by contingency software running on the robot, and the robot's path may be modified or the robot stopped. As another example, a robot may be given an Internet command to grasp an object. The robot may interpret this command by use of its local on-board vision processing to ensure that its mechanical manipulators are properly positioned, etc. In still another example, a robot may simply move over a preprogrammed path in a repetitious manner.

For greatest flexibility, the robotic software should be designed to enable the remote Internet controller to upload new automatic instructions or scripts to the robot. These uploaded automatic commands will typically be used to control the robot when the remote user is off-line, when extremely rapid action is required, or when a complex series of actions is required. In addition to robotic control instructions, these instructions may also include an automatic series of commands to query SBDRL devices, and commands to send to various SBDRL devices.

These local automatic robotic control instructions (or scripts) may be written in a wide variety of formats and languages. These may include anything from simple test commands, to complex binary programs. Since many such local control instructions are possible, each potentially quite situation specific, automatic control instructions written in formats that facilitate rapid development and deployment, preferably by automated means, are preferable. Examples of preferred formats for rapid development and deployment instructions include XML scripts, PERL scripts, JAVA applets, and the like.

In addition to flexible remote control methodology, it is also desirable to give a robot flexible means to interact with its local environment. Here, some deviations from prior art are advantageous.

Prior art generally teaches that mobile robots primarily interact with their environment through sensors and mechanical actuators (robotic arms, and the like) located on the robot itself. However this is not always desirable. Using onboard mechanical actuators as the sole means to interact with the robot's environment can add significant cost and weight to the robot. Such mechanical systems can also make considerable power demands on a robot's onboard battery, which will typically have only limited power capacity. An additional problem is that it is difficult to design on-board robotic mechanical manipulators that can function well in a wide range of situations. Robot design constraints such as limited size and battery life, may require that the robot's onboard mechanical manipulators have limited dexterity or lifting power.

To enhance flexibility and generality, it is advantageous if the mobile robot is designed with general means to interact with various external sensors, external mechanical manipulators and external appliances. The robot may then travel into range of the external devices, and call upon them to assist the robot at the task at hand. For example, a family of external, fixed position, mechanical manipulators, controlled by a local SBDRL link, can be used in combination with the Internet connected mobile robot to accomplish various tasks. Here, an external, non-mobile set of arms could load and unload items from a carrying tray on the robot, and the like. The robot can use its onboard sensors to monitor the progress of the operation, and to relay commands from the remote Internet operator to the external mechanical manipulators.

In addition to external mechanical manipulators, it is also advantageous is the mobile robot is designed to use SBDRL means to interact with local appliances. Examples of appliances which might be upgraded to add SBDRL capability for these purposes include industrial and laboratory processing equipment, as well as household appliances such as refrigerators, ovens, dishwashers, washing machines, clothes dryers, lights, sprinklers, floor cleaners, lawnmowers, security system, audiovisual systems, pet feeders, heating/air conditioning systems, automatic doors, and the like.

Additionally, by use of the onboard Internet router, the robot may interact with non-internet connected computers or microprocessor devices and enable the exchange of data packets between the previously non-internet connected computers or microprocessors, and the Internet.

To enhance flexibility and generality, it is also advantageous if the mobile robot is designed with general means to interact with various external sensors. This may include SBDRL capable local vision systems, and other local sensor systems.

Vision systems: Although it is advantageous for a mobile robot to have its own onboard vision system, which can relay its activities and position to remote human or computer control systems, such on-board vision systems suffer from a limited field of view. This can make it particularly difficult for remote human or automated vision system to control the robot. This problem can be alleviated by the use of external SBDRL vision systems. Such systems can be mounted in more advantageous places, such as the ceiling of a room, which can give a wider field of view. Alternatively, such systems can be mounted in such a way; such as with a microscope attachment, that can give the robot a more detailed field of view.

As an example, a robotic system moving into a room that has a SBDRL vision system on the ceiling will receive a more global perspective of its surroundings. The robot can then internally process this new perspective, or alternatively transmit the new perspective to a remote Internet control site, to assist in robot control.

Many other types of external sensors are also be linked to a mobile robot by short-range digital links. These include environmental sensors, process sensors, chemical sensors, and the like.

One useful type of sensor is an object-reporting sensor, such as a radiofrequency identification tag (RFID tag). Such tags may contain a memory cache containing useful information, such as the object identifier, expiration date, and other characteristics.

Discovery of locally available SBDRL devices: Although in some situations, the distribution and functionality of the various external SBDRL devices will be known to the robot or the remote operator before the robot moves into proximity of the device, in other situations, this will not be previously known. In these later situations, where the distribution and functionality of the SBDRL devices is not previously known in advance, it is advantageous if the robot and the SBDRL devices are equipped to enable automatic discovery of the nature, functions, and services provided by each device.

A number of schemes to enable automatic discovery of the nature, functions, and services of remote devices are known in the art. This includes schemes such as "Jini™", Universal plug and play™, Salutation™, Service Location protocol, etc. One scheme, particularly useful for "Bluetooth" (IEEE 802.15b) type devices makes use of the "Service Discovery Protocol". Briefly, Bluetooth type SBDRL devices may maintain a service registry consisting of both device identifiers, and functions of the device that are available for use over the SBDRL link. Upon SBDRL query, if the device has its' discovery functionality enabled, this information is made available to the inquiring device.

By querying such SBDRL service registry information, and either processing it using the robot's own onboard computer processor(s), or passing the information along to a remote controller on the internet, SBDRL devices not previously known to the robot and/or its remote internet operator may be utilized. This greatly increases the flexibility of the robot, and thus use of SBDRL devices that enable remote discovery of their nature and services is generally preferred. To better facilitate cooperation with other external devices, the robot itself may also maintain a discoverable SBDRL "service discovery protocol" describing the robot's own nature and useable functions.

For other situations, such when the SBDRL is a relatively simple RFID tag, the signal from the robot to the tag may be used to power-up the tag, either through the energy from the robot's radio signal, or through a simple digital "1" sent from the robot to the SBDRL RFID tag. In either case, the robot's message to the SBDRL unit can be as simple as an "I am in close proximity, start transmitting", which is equivalent to a digital "1". By contrast, the lack of robot close proximity can be considered to be a digital "0".

BRIEF DESCRIPTION OF THE DRAWINGS

Examples of robotic systems constructed according to the concepts taught herein are shown in FIGS. 1, 2, and 3.

DETAILED DESCRIPTION OF THE INVENTION

Figure 1:
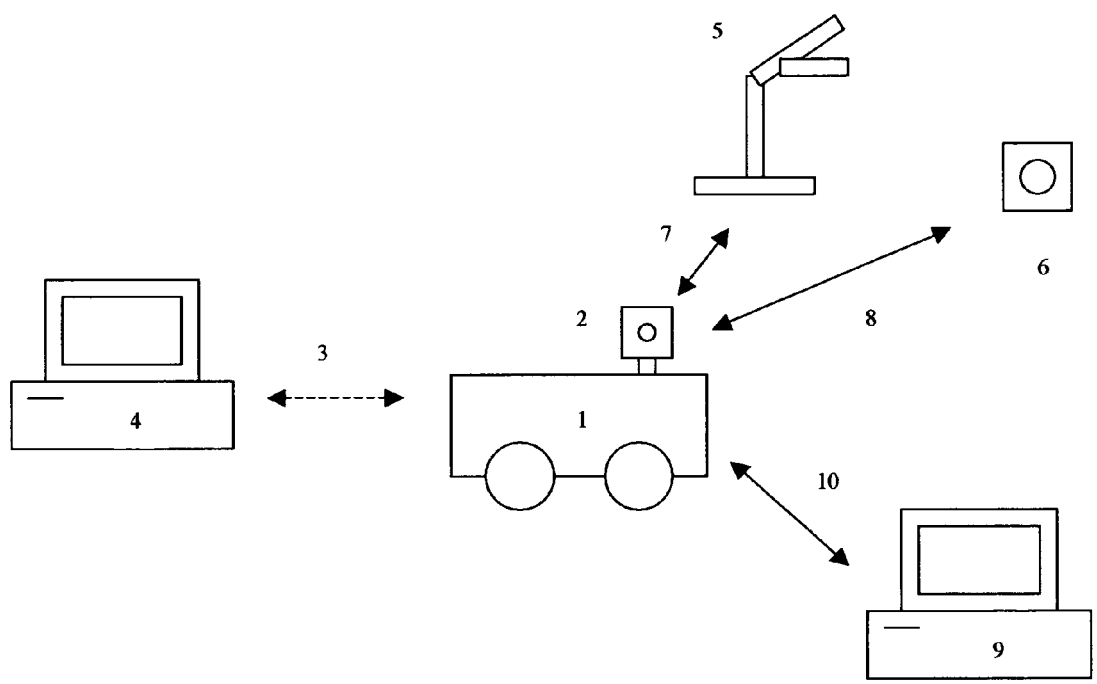
FIG. 1 shows an example of a mobile robot, equipped with an onboard camera, which is controlled by a link to a remote Internet web browser. The mobile robot has an onboard Internet router, and has additional SBDRL links with three external devices. In this example, one external device is a non-mobile robotic arm, a second external device is an external camera, and a third external device is a local computer.

FIG. 1 shows the general hardware scheme, employing a single mobile robot and three exemplary external SBDRL devices. A mobile robot (1), equipped with its own onboard camera (2), sends HTML files using the HTTP protocol on telecommunications link (3) to a web browser running on remote internet site (4). In response to CGI data sent back from the user on web browser (4) to the CGI interface of the robot's onboard web server, as well as the robot's own onboard commands, the mobile robot (1) moves into close proximity with SBDRL enabled external devices, such as a external robotic arm (5) and a external camera (6). The mobile robot (1) uses SBDRL radio signals (7), (8) to discover the presence and functionality of the robotic arm (5) and camera (6). The robot relays information from its own onboard camera (2) and the external camera (6) to remote Internet browser (4). The remote user may then direct the robot to send SBDRL signals to control the movement of external robotic arm (5). In one application, the external robotic arm might load objects onto the robot for subsequent transport elsewhere. In a second application, an Internet router on mobile robot (1) connects a previously non-internet connected computer (9) to the Internet by radio link (10).

Figure 2:
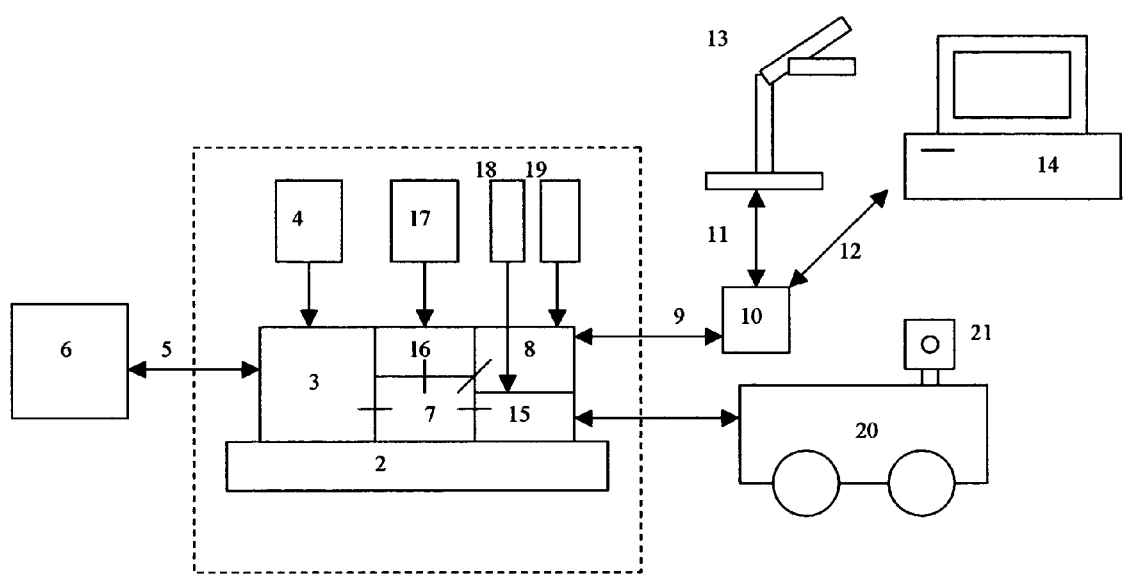
FIG. 2 shows an example of the software scheme used to control the robotic system shown in FIG. 1.

FIG. 2 shows the general structure of the software (1) onboard the robot. The robot's computer processor is typically controlled by a multitasking operating system (2) (usually a real-time operating system, or a variant of a general purpose operating system such as Linux), which either runs a separate web server software process (3), or else intrinsically has web server functionality as part of the operating system (3). The web server (3) is able to read HTML files (4) stored in the robot's onboard memory, and transmit them via long-distance telecommunications link (5) and HTTP protocol to remote web browser (6). Web server (3) also has CGI interfaces (7). These CGI interfaces are capable of sending and receiving data from most or all of the other software processes running onboard the robot.

Also running on the robot's operating system (2) is SBDRL interface software (8) to handle input/output (9) from the robot's onboard SBDRL transceiver (10). This transceiver (10) is capable of establishing SBDRL radio links (11), (12) with external SBDRL devices (13), (14). Transceiver (10) may optionally function as an Internet router, connecting external devices (13) and computers (14) with the Internet.

Additionally running on the robot's operating system (2) are robotics control software (RCS) (15) which controls various robotics hardware such as motion control motors, onboard sensors, onboard mechanical manipulators, power management, and the like. Also running (16) are additional JAVA, PERL, PYTHON, C, etc., interpreters and compilers as needed to run various control instructions.

In use, the robot's web server (3) establishes contact over communications link (5) with remote Internet browser (6). The robot's web server (3) transmits HTML file (4) to remote browser (6), and receives back requests for additional web pages and CGI commands (using either the GET or POST method) from remote browser (6). The robot's web server (3) directs the CGI commands through CGI interface (7) to various robotic programs or files, depending upon the robot's state and the nature of the commands sent from the remote browser.

Remote browser commands that are essentially requests for additional web pages (for example, a command to access a particular robotic function that has an interface on a different web page) are handled directly by the robot's onboard web server (3), which sends additional web pages from HTML file (4) back to remote browser (6). Remote browser CGI commands for general robotics intelligence or additional web page functionality (for example, to read from or update a robotic database) are passed through CGI interface (7) to other programs (e.g. database systems, such as SQL servers, and the like) (17) in the robot's onboard memory, also running under operating system (2). Other interpreters (JAVA, PERL, etc) may optionally run these other programs (17), (16) as needed.

The Robot's interface with its local environment (e.g. robotic movement, sensors, actuators, power, etc.) is primarily handled by RCS software (15). The robotic SBDRL (input/output) links are handled by the short-range digital radio interface software (8). These programs (15), (8) can either run directly from operating system (2), or through interpreter programs (16). The RCS software (15) in turn can look for supplemental instructions, scripts, algorithms, and the like, in robotic control files (18) in the robot's onboard memory. The robotic SBDRL interface software can also look for supplemental instructions, scripts, algorithms and the like in SBDRL control files (19) in the robot's onboard memory.

In use, a remote browser command for robotic movement might initially result in server (3) sending a robotic movement interface web page (4) to remote Internet browser (6). The remote internet user might then send back CGI commands requesting robotic movement back to server (3), which is passed through CGI interface (7) to RCS software (15). RCS software (15) then executes the command to alter the location of robot (20). The RCS software is optionally able to draw upon supplemental information stored in onboard robotic control file (18) to assist in the process. The RCS software (15) also passes information as to the results of the movement command back through CGI interface (7) to server (3), which updates web page (4) on remote browser (6) to give the user feedback on the success of the movement request. Optionally, data from camera (21) (or other sensors) mounted onboard the robot are also sent back through RCS software (15), CGI interface (7), web server (3) to browser (6) to give the user an updated image of the robot's view.

A remote browser command to assess or modify the state of SBDRL devices local to the robot would be handled by one or more of the following. In one option, when robot (20) travels into range of the SBDRL devices (13), (14), the robot's onboard digital radio transceiver (10) detects devices (13) and (14), and relays the information back through the SBDRL interface software (8). Depending upon previously assigned instructions in SBDRL control file (19), the SBDRL interface software may be assigned to automatically query the registries of SBDRL devices (13) and/or (14) to determine their capabilities, and which of their functions are available for SBDRL controlled robotic use.

SBDRL interface software (8) sends information as to the status of the SBDRL devices back through CGI interface (7) to web server (3), which, depending upon the status of HTML files (4) may update the remote browser (6) with information that the robot is within range of the local radio devices, and optionally give the local device status information. The remote Internet user can then directly control the robot or the SBDRL devices as appropriate.

Alternatively, the SBDRL control instructions (19) may direct the SBDRL interface software (8) to process the SBDRL information in several alternative ways.

If the standing orders in SBDRL control file (19) are to modify the state of SBDRL devices (13), (14) without requesting further input from remote internet site (6), then the processed output from (19) may be fed back to via the SBDRL interface software (8) to transceiver (10) to modify the state of SBDRL devices (13), (14).

If the standing orders in (19) are to modify the state of the robot (e.g. move in a different path, change the state of a robotic sensor, or activate an actuator), without requesting further input from remote internet site (6), then the processed instructions from (19) may be fed back to the RCS software (15) to modify the state of robot (20). For example, there could be a standing order in (19) that if the robot receives a message from a local SBDRL equipped fire alarm that the environment was too hot, the robot could activate a previously assigned set of commands to move out of the area.

If the standing orders in (19) are to automatically update an internal database (17) without requesting further Internet controller input, then the processed output from SBDRL interface software (8) may be fed back to database software (17). For example, there could be a standing order in (19) that a robot patrol an area, and automatically save data from local external SBDRL equipped sensors into a log for later analysis.

If the standing orders in (19) are to act as a mobile Internet router, then the robot's router (10) will connect external computer or microprocessor-controlled device (14) directly to the Internet.

For robots equipped with an internet router, the router (10) may be optionally configured so as to also be capable of directly transferring data packets from local SBDRL devices to the robot's own internet connection (3), (5), (6). In this way, a web browser running on local computer (14) may also directly access the robot's web server, and thus gain full control over the robot's services.

The standing orders stored in supplemental RCS control file (18) may be also be used in a manner similar to just described for SBDRL control file (19).

SPECIFIC EMBODIMENT OF THE INVENTION

Figure 3:
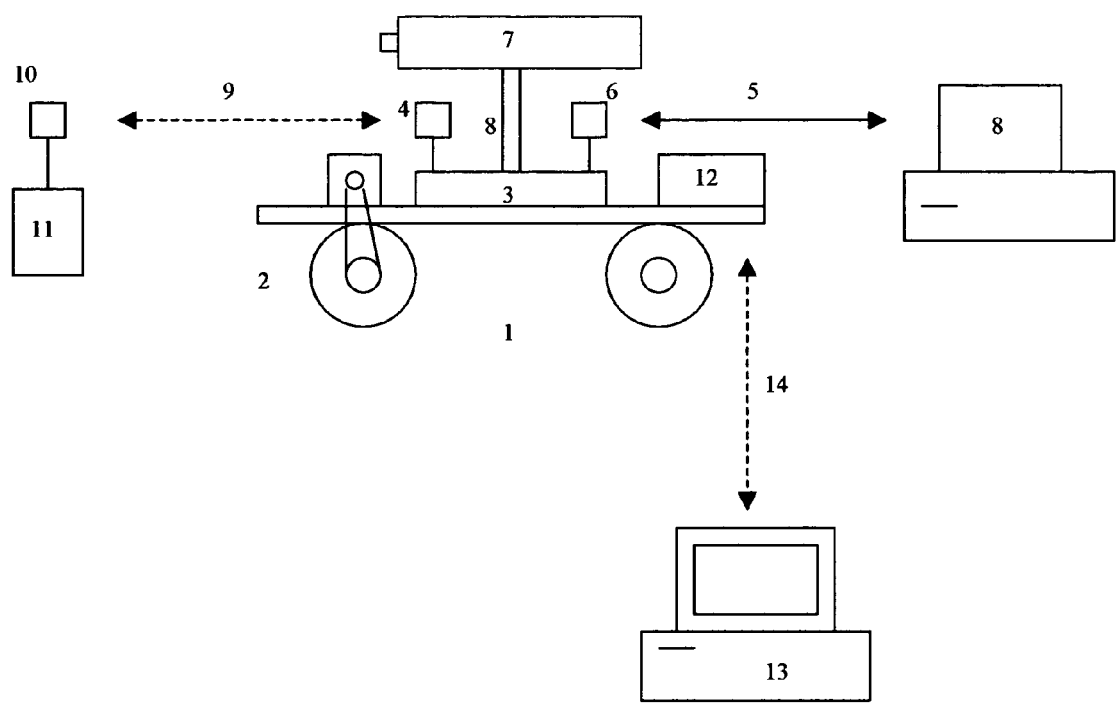
FIG. 3 shows a schematic of a specific robotic design.

FIG. 3 shows a diagram of a mobile robot (1) that may be constructed based upon a battery powered chassis with motorized wheels (2), controlled by an Axis ETRAX 100 Developer Board (3) (Axis Communication AB, Lund, Sweden). This developer board, which may be used as the main robotic control unit, contains an EXTRA 100 32 bit central processor unit, 2 megabytes flash memory, and 8 megabytes ram. The software on this board runs using an embedded Linux operating system (uClinux based on 2.0.38 Linux). The developer board is connected to an Ericcson bluetooth module (4) by a RS232 serial port, driven by Axis bluetooth driver software. The developer board is additionally connected to a wireless Internet connection (5) (using a sprint PCS cell phone (6)) by a second RS232 serial port, driven by the onboard Axis "boa" web server software.

The robot's motorized wheels (2) are controlled through an interface to the Axis developer board's parallel port (3). The robot additionally has an onboard internet capable digital camera (Axis 2100 network camera (7)) that can take video pictures of the robots surroundings, compress them, and process the results into an HTML based web page via the camera's own separate onboard computer processor.

The Axis 2100 network camera (7) is interfaced to the Axis Developer Board (main robotic CPU) board (3) via an Ethernet connection (8). The web server onboard the Axis developer board, which has the main robotic CPU, is given overall control of the system. It is pre-programmed with HTML code (analogous to software file (4) from FIG. (2)) that initially responds to remote internet web browser web-page requests by sending a general "index.html" file that gives the robot's name, and status (power levels, bluetooth devices in-range, etc. as updated by CGI data), and a menu of possible user actions.

In this design demonstration, commands from the remote Internet web browser (8) to control SBDRL (bluetooth) devices are passed through the robot's web server CGI interface to a bluetooth input/output module, built into the Axis development board. This bluetooth command is interpreted by the input/output module, and in-turn is directed to a bluetooth transceiver (4) mounted on the robot. In this simple design example, the bluetooth transceiver onboard the robot and the bluetooth transceiver (10) onboard the external SBDRL device (11) may be commanded to go into a bluetooth transmission state (9) that simulates a direct RS232 connection. This makes the two devices act as if they were directly connected by standard RS232 cable. With this scheme, an external bluetooth device (11) can be commanded to beep by simply sending a standard ASCII "Bell" character.

The robot may additionally carry a wireless "Wi-Fi" Internet router (12), capable of automatically connecting external computers or microprocessor controlled devices (13) to the Internet by way of SBDRL radio links (14)

User requests for robotic movement are initiated by remote browser (8) sending a URL request for a robotic movement web page. This causes the server (3) to send a new web page to the user's browser (8). This page is divided into frames, one frame containing the robot movement control forms and bluetooth device interface forms, and a second frame containing a URL link to the Axis 2100 network camera, which sends picture data independently.

The robotic movement web page contains HTML forms to allow direct user control over the robot's motion, and additional HTML forms to allow the user to upload optional, prewritten, scripts to control the robot automatically for short periods of time. Normally, user requests for immediate and direct control are sent back to the robot's onboard web server (3), where they are passed though the server's CGI interface to a simple robotic control software (RCS) program. The RCS program is written as a CGI compliant "C" program executing in the /cgi-bin directory of the robot's main server. This program translates motion requests (forwards, backward, left turn and right turn) into commands that are sent out through the Axis board's parallel port (3) to the robot's motion control system (2)

The remote user also has the option of uploading one or more script files, analogous to files (18) and (19) from FIG. 2, that contain information (scripts) needed to run the RCS program and bluetooth interface program automatically. These script files may contain instructions to automatically query SBDRL devices as to their status, and automatically to upload commands to specific SBDRL devices. The script files may also contain instructions to control robotic movement in response to data downloaded from SBDRL devices, from data obtained directly from the robotic sensors, or both. These scripts may be anything from simple text files to complex programs.

An example of a simple robotic and SBDRL automatic control script file, written in XML format, is shown below:

Sample script:

```
<Move>
    <Forward="10">
    <Turn="90">
    <Forward ="5">
</Move>
<Pause="10"/>
<YesBluetooth>
    <Beep="true">
    <Pause="2">
    <Beep="false>
</YesBluetooth>
<</NoBluetooth>
    <Turn"360">
</NoBluetooth>
<Move>
    <Forward="-5">
    <Turn="-90">
    <Forward="-10">
</Move>
```

When the remote user uploads this file, and commands that it be executed, the robot will automatically move forward 10 spaces, turn right 90 degrees, move an additional five space, and wait 10 seconds. It will then attempt to make contact with a Bluetooth device. If it discovers a bluetooth compliant device <YesBluetooth>, it will send it a "beep" command for two seconds, and then turn off the remote device's beep. If it does not discover such a device <NoBluetooth>, it will spin in a circle. When either action is complete, the robot will then return to its original location.

In this example, a non-internet connected computer FIG. 3—(13) equipped with a SBDRL radio link that is normally out of range with the internet may be located near the Bluetooth device. When the robot comes in range of the Bluetooth device, the router FIG. 3—(12) that now is within range of the SBDRL radio link on the local computer can then relay data packets between the computer and the Internet, and thus connect the computer with the Internet. Once the robot returns to its original position, the distance becomes too great and the computer's connection to the Internet is again lost.

Alternatively, the previously non-internet connected computer FIG. 3—(13) may direct the robot to remain within range longer, or alternatively direct the robot to travel to an intermediate position where the robot's router is within range of both the internet and the computer's SBDRL transceiver.

In another configuration, the non-internet connected computer FIG. 3—(13) may direct a non-internet connected robot to seek out an Internet connection, and use the robot's onboard router to serve as a relay between the non-internet connected computer and the Internet.

As previously mentioned, in this design example, both remote Internet users, as well as local computer users, can see what the robot is doing. To allow remote or local users to see what the robot sees, the HTML form served by the robot's onboard web server directs the user's browser to divide the browser screen into frames, and for the video frame, get video data from a different URL controlled by second web server embedded in the Axis 2100 network camera itself. The video computer onboard the Axis 2100 camera handles user video requests, captures the video, and compresses it for internet transmission itself, without requiring additional processing from the main robotic computer onboard the Axis developer board that controls both the robot's web server and the other robotic control functions.

This serves to illustrate that the robotic system taught here need not contain only one computer. Rather, the computer powering the robot's web server, which is used as the primary input-output control means of the robot, can offload computationally intensive processing tasks to secondary computer processors onboard the robot, as necessary.

What is claimed is:

1. A mobile robot with an onboard web server, telecommunications means to link the onboard web server with the internet, and onboard telecommunications means to establish additional short-range bi-directional digital radio links with a plurality of external computer controlled devices:
   wherein the mobile robot, under control by commands sent over the internet, travels into the vicinity of one or more of the external computer controlled devices and establishes a bi-directional, short-range, digital radio link with the external device.

2. The robot of claim 1, in which the onboard telecommunications means acts as a router to transmit data packets between the internet and the external computer controlled devices.

3. The robot of claim 2, in which the onboard telecommunications means acts as a router to transmit data packets between the internet and the external computer controlled devices.

4. A mobile robot with an onboard web server, telecommunications means to link the onboard web server with the internet, and onboard telecommunications means to establish additional short-range bi-directional digital radio links with a plurality of non internet connected external computer controlled devices:
   wherein the mobile robot, under control by commands sent over the internet, travels into the vicinity of one or more of the external computer controlled devices and establishes a direct bi-directional, short-range, digital radio link with the external device.

5. A mobile robot with an onboard web server, and onboard router; telecommunications means to link the onboard web server and router with the Internet; telecommunications means to establish additional short-range bi-directional digital radio links with a plurality of local units selected from the group consisting of external computers, RFID tags, or microprocessor-controlled devices:
   wherein the mobile robot performs one or more functions selected from the group consisting of:
   (A) establishing a link with the internet, traveling into the vicinity of one or more of the local units, establishing a bi-directional short-range, digital radio link with these local units, and relaying data packets between these local units and the internet;
   (B) establishing a bi-directional, short-range, digital radio link with a local unit, and then traveling into range of an internet connection, and relaying data packets between these local units and the internet.

6. The robot of claim 5, in which the local units were not connected to the Internet, and in which the bi-directional, short-range, digital radio link is a direct link.

7. A mobile robot with an onboard web server, telecommunications means to link the onboard web server with the internet, and onboard telecommunications means to establish additional short-range bi-directional digital radio links with a plurality of external digital radio controlled devices:
   said internet consisting of an interconnected system of networks that connects computers around the world via the TCP/IP protocol,
   said external digital radio controlled devices being controlled by short range bi-directional digital radio links;
   wherein the mobile robot, under control by commands from either the robot's internal programming, the robot's response to environmental stimuli, from the internet, or from an external digital radio controlled device, travels into the vicinity of one or more of the external digital radio controlled devices and establishes a bi-directional, short-range, digital radio link with the external digital radio controlled device; in which the onboard telecommunications means acts as a router to transmit data packets between the internet and the external digital radio controlled device.

8. The robot of claim 7, in which said external digital radio controlled device is a radiofrequency identification tag (RFID tag), and in which said RFID tag is powered by the energy from the robot's radio signal.

* * * * *